(12) United States Patent
Wang et al.

(10) Patent No.: US 10,178,615 B2
(45) Date of Patent: Jan. 8, 2019

(54) DEVICE, SYSTEM, AND METHOD FOR ADAPTIVE SCHEDULING REQUEST SUPPRESSION

(71) Applicant: APPLE INC., Cupertino, CA (US)

(72) Inventors: Beibei Wang, Cupertino, CA (US); Zhu Ji, San Jose, CA (US); Johnson O. Sebeni, Fremont, CA (US)

(73) Assignee: APPLE INC., Cupertino, CA (US)

( * ) Notice: Subject to any disclaimer, the term of this patent is extended or adjusted under 35 U.S.C. 154(b) by 61 days.

(21) Appl. No.: 15/178,897

(22) Filed: Jun. 10, 2016

(65) Prior Publication Data
US 2017/0359779 A1    Dec. 14, 2017

(51) Int. Cl.
| | | |
|---|---|---|
| *H04W 52/02* | (2009.01) | |
| *H04J 11/00* | (2006.01) | |
| *H04W 72/04* | (2009.01) | |
| *H04W 72/14* | (2009.01) | |
| *H04W 40/00* | (2009.01) | |
| *H04L 12/26* | (2006.01) | |
| *H04L 1/18* | (2006.01) | |

(Continued)

(52) U.S. Cl.
CPC ......... *H04W 52/0209* (2013.01); *H04J 11/00* (2013.01); *H04L 1/1812* (2013.01); *H04L 43/028* (2013.01); *H04L 43/16* (2013.01); *H04W 40/005* (2013.01); *H04W 72/0413* (2013.01); *H04W 72/14* (2013.01); *H04W 76/28* (2018.02); *H04W 88/02* (2013.01); *H04W 88/08* (2013.01); *Y02D 70/12* (2018.01); *Y02D 70/126* (2018.01); *Y02D 70/20* (2018.01)

(58) Field of Classification Search
CPC .......... H04W 52/0209; H04W 40/005; H04W 72/0413; H04W 72/14; H04W 76/048; H04W 88/02; H04W 88/08; H04W 76/28; H04J 11/00; H04L 1/1812; H04L 43/028; H04L 43/16; Y02D 70/126; Y02D 70/12; Y02D 70/20
See application file for complete search history.

(56) References Cited

U.S. PATENT DOCUMENTS

| | | | | |
|---|---|---|---|---|
| 2014/0301373 | A1* | 10/2014 | Cili | ..................... H04W 76/048 370/336 |
| 2015/0092643 | A1* | 4/2015 | Khay-Ibbat | ....... H04W 52/0203 370/311 |

(Continued)

*Primary Examiner* — Walli Z Butt
(74) *Attorney, Agent, or Firm* — Fay Kaplun & Marcin, LLP

(57) ABSTRACT

A method and device for scheduling SR transmissions for a user equipment (UE) associated with an evolved Node B (eNB) of a Long Term Evolution (LTE) network. The method includes determining an SR is to be transmitted to the LTE network, determining an uplink grant behavior of the eNB, when the uplink grant behavior of the eNB indicates that previous uplink grants satisfy a threshold of previous grants occurring in onDurations of the cycle of a C-DRX functionality, selecting one of the at least one SR opportunity that follows a next onDuration relative to when the indication is received and scheduling the SR in the one of the at least one SR opportunity that follows the next onDuration. The method further including determining an uplink grant turnaround time associated with the eNB, and selecting one of the at least one SR opportunity based on the uplink grant turnaround time.

19 Claims, 5 Drawing Sheets

(51) Int. Cl.
*H04W 76/28* (2018.01)
*H04W 88/02* (2009.01)
*H04W 88/08* (2009.01)

(56) References Cited

U.S. PATENT DOCUMENTS

2015/0092645 A1* 4/2015 Tabet .................... H04L 1/1825
                                                            370/311
2017/0208619 A1* 7/2017 Yang ................ H04W 72/1284

\* cited by examiner

DEVICE, SYSTEM, AND METHOD FOR ADAPTIVE SCHEDULING REQUEST SUPPRESSION

BACKGROUND INFORMATION

A user equipment (UE) may be configured to establish a connection with a network. For example, the UE may be a mobile device and utilize a wireless communications protocol. During the connection with the network, the UE may be configured with a specification or schedule in which information may be received to determine wireless properties such as channel estimation, time tracking loop, frequency tracking loop, etc. Also while connected to the network, the UE may execute an application in which data is transmitted to the network. Prior to data transmission, the UE may transmit a scheduling request to the network in a substantially similar manner as the information related to the wireless properties. Subsequently, the network may issue an uplink grant that schedules when the data is to be sent as an uplink transmission.

The transmission schedule is configured to optimize power conservation. Specifically, the schedule indicates active time periods and sleep time periods. A deviation from the set time periods by introducing further operations such as the scheduling request and the subsequent uplink grant received in response to the scheduling request potentially increases the active time periods and power consumption. For example, the UE may immediately transmit the scheduling request in the next available scheduling request opportunity in the transmission schedule. However, this manner of transmitting scheduling requests often results in higher amounts of power consumption.

SUMMARY

Described herein is an exemplary embodiment of a method performed by a user equipment (UE) associating with an evolved Node B (eNB) to establish a connection to a Long Term Evolution (LTE) network, the UE and the LTE network configured with and utilizing a Connected Discontinuous Reception (C-DRX) functionality, the C-DRX functionality including a cycle with at least one scheduling request (SR) opportunity. The method including determining an SR is to be transmitted to the LTE network, wherein the SR corresponds to data that is to be transmitted by the UE, determining an uplink grant behavior of the eNB, when the uplink grant behavior of the eNB indicates that previous uplink grants satisfy a threshold of previous grants occurring in onDurations of the cycle of the C-DRX functionality, selecting one of the at least one SR opportunity that follows a next onDuration relative to when the indication is received and scheduling the SR in the one of the at least one SR opportunity that follows the next onDuration.

Also described herein is an exemplary user equipment having a transceiver configured to associate with a network component to establish a connection to a network, the UE and the network configured with and utilizing a discontinuous reception (DRX) functionality, the DRX functionality including a cycle with at least one scheduling request (SR) opportunity and a processor configured to control an operation of the transceiver. The processor controls the operation of the transceiver by determining an SR is to be transmitted to the LTE network, wherein the SR corresponds to data that is to be transmitted by the UE, determining an uplink grant behavior of the eNB, when the uplink grant behavior of the eNB indicates that previous uplink grants satisfy a threshold of previous grants occurring in onDurations of the cycle of the C-DRX functionality, selecting one of the at least one SR opportunity that follows a next onDuration relative to when the indication is received and scheduling the SR in the one of the at least one SR opportunity that follows the next onDuration.

Further described herein is an exemplary embodiment of a method performed by a user equipment (UE) associating with an evolved Node B (eNB) to establish a connection to a Long Term Evolution (LTE) network, the UE and the LTE network configured with and utilizing a Connected Discontinuous Reception (C-DRX) functionality, the C-DRX functionality including a cycle with at least one scheduling request (SR) opportunity. The method including determining an SR is to be transmitted to the LTE network, wherein the SR corresponds to data that is to be transmitted by the UE, determining an uplink grant turnaround time associated with the eNB, the uplink grant turnaround time being a measure of time corresponding to the eNB issuing an uplink grant in response to a SR that is received from the UE and selecting one of the at least one SR opportunity based on the uplink grant turnaround time.

DETAILED DESCRIPTION

Figure 1:
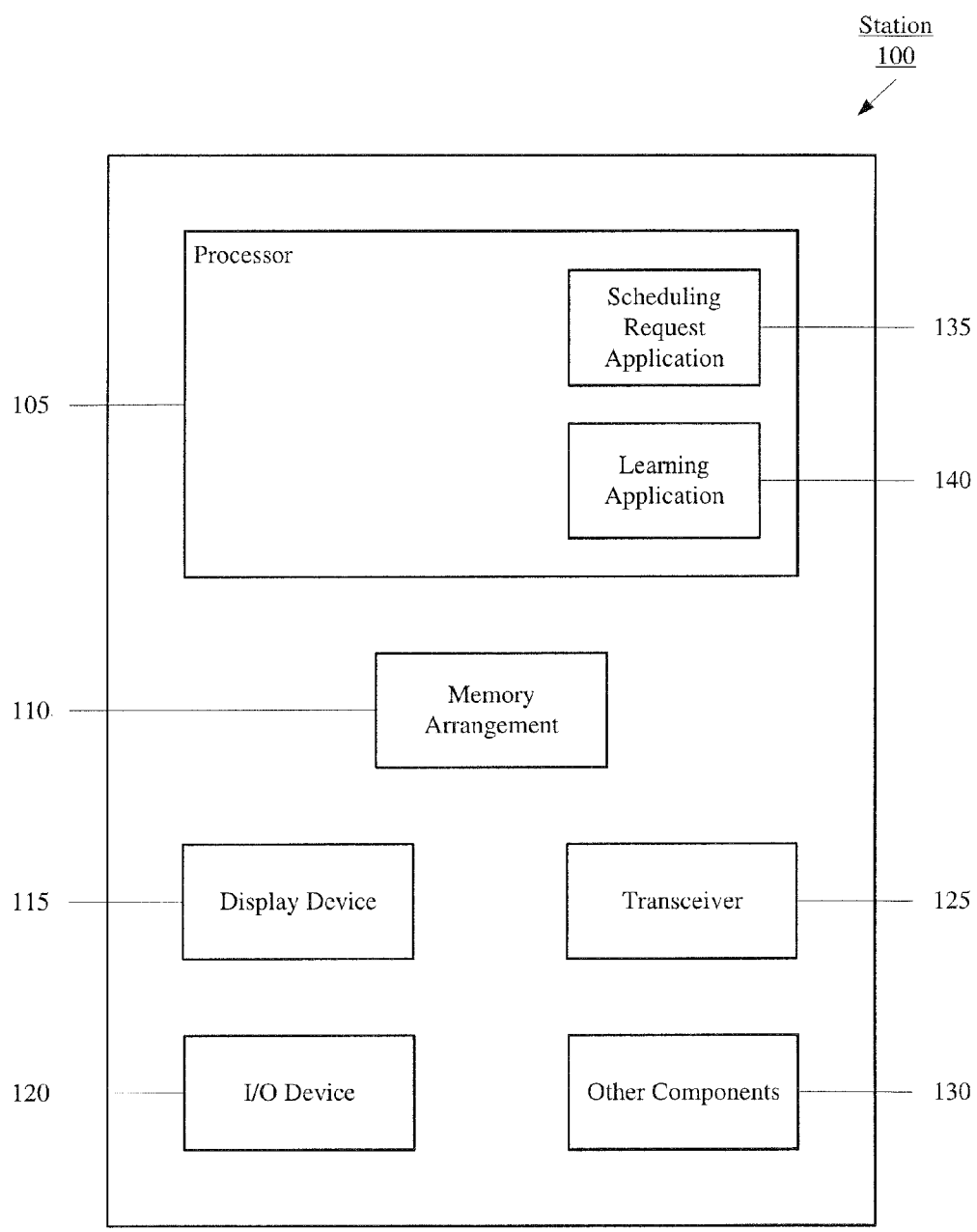
FIG. 1 shows a user equipment for determining when a scheduling request is to be transmitted according to various embodiments described herein.

The exemplary embodiments may be further understood with reference to the following description and the related appended drawings, wherein like elements are provided with the same reference numerals. The exemplary embodiments are related to a device, system, and method for determining when a scheduling request (SR) is to be transmitted. Although a user equipment (UE) may operate according to a schedule such that transmissions and processes are only performed at defined intervals, the UE may have data that is ready to be transmitted to the network at any time within the schedule. In this situation, the UE will transmit a SR to the network to receive an uplink grant to transmit the data to the network. The mechanism according to the exemplary embodiments dynamically determine when to schedule the SR for transmission to the network using various factors including an uplink grant pattern associated with a base station of the network to which the UE is associated to connect to the network.

Throughout this description, the term "data Tx ready event" will be used to describe a situation when the UE has data that is ready to be transmitted to the network. For example, the UE may be executing an application at the application layer of the network stack of the UE. This application may generate data that is to be sent to the network. The application layer (and/or other upper level layers) will prepare the data that is to be transmitted. The upper level layers will pass the data to lower layers, such as the MAC layer of the UE's network stack. When the data arrives at the MAC layer, this will be an indication to, for example, the MAC layer of the UE stack that there is data that is to be transmitted to the network, e.g., the UE has a "data TX ready event." Part of the process of transmitting the data to the network is to transmit the SR so as to receive an uplink grant to transmit the data. Thus, the data Tx ready event may be considered the time when the UE begins the process of attempting to send the data to the network and one of the steps in this process is determining when to transmit the SR to the network. It should be noted that the arrival of the data at the MAC layer is only an example of the initiation of the data Tx ready event. Those skilled in the art will understand that the data will travel down the UE stack until it arrives at the physical layer for actual physical transmission. The data Tx ready event may be defined, for example, as starting when the data reaches any of the lower level layers, e.g., RRC connection layer, physical layer, link layer, etc. In addition, there may be other situations unrelated to arrival at a network layer that signals to lower layers of the UE stack that there is a data Tx ready event for a particular piece of data that is to be transmitted to the network.

A UE may establish a connection to a wireless communications network via a base station (e.g., an evolved Node B (eNB) in Long Term Evolution (LTE) networks). To properly be prepared for demodulating signals (i.e., received signals by the UE), the UE must be configured with proper settings. Specifically, properties related to the physical layer of the transceiver used to connect to the network must be known. For example, the channel (e.g., band of frequencies) must be known for the incoming signal for it to be properly received. Therefore, control channel information such as physical downlink control channel (PDCCH) information, reference symbols, etc. may be received in a background operation during connection with the LTE network. Furthermore, to properly be configured to transmit signals (i.e., transmitted signals from the UE), the UE must be allowed by the LTE network to perform the data transmission via an uplink grant. The PDCCH information may include the uplink grant.

A UE connected to the LTE network may utilize a predetermined manner of receiving the control channel information. For example, a discontinuous reception (DRX) functionality may be used. Specifically, a cycle associated with a connected DRX (C-DRX) may be used. The C-DRX relates to utilizing an active mode of data exchange/processing and a sleep mode of inactivity to conserve power. The C-DRX may include a specification or schedule in which the control channel information is received. Therefore, the UE uses the active mode at defined intervals to perform scheduled operations such as receiving the control channel information. The time period at which the control channel information is received may be termed the onDuration for the C-DRX cycle. The onDuration relates to a number of frames over which the UE reads downlink control channel information every C-DRX cycle before entering the sleep mode. Thus, at all other times during the C-DRX cycle, the UE may utilize the sleep mode.

The C-DRX cycle may have a predetermined duration N such as 40 milliseconds (ms), 20 ms, etc. For example, at a time 0, there may be an onDuration for the control channel information to be received in which the active mode is used; subsequently, upon the onDuration ending, the sleep mode is used; then at a time N, there may be another onDuration; subsequently, the sleep mode is again used until a time 2N; etc. It should be noted that the sleep power mode does not necessarily mean placing the processor, the transmitter, and the receiver of the UE to sleep, hibernate, or deactivate. For example, the processor may continue to execute other applications or processes. The sleep power mode relates to conserving power by discontinuing a continuous processing relating to receiving transmissions from the network and calculating the wireless properties of the UE.

It is noted that the exemplary embodiments are described herein with regard to the LTE network in which the C-DRX functionality is used. However, those skilled in the art will understand that the functionalities described herein may be applied to other network arrangements. For example, it is anticipated that 5G networks will implement a discontinuous reception cycle similar to C-DRX. Thus, the functionalities described herein may also be implemented for UEs that connect to future 5G networks.

The UE connected to the LTE network may also execute applications where a data transmission is scheduled prior to the actual transmission. The UE may transmit a SR to the eNB to schedule the data transmission. The SR relates to a request from the UE to the network to provide an uplink grant so the UE can transmit the data (e.g., voice data received from the user in a Voice-over-LTE (VoLTE) call). Upon receiving the SR, the eNB may generate the control channel information to be transmitted to the UE in which this control channel information may include an indication of whether the UE is allocated an uplink grant to transmit the data. The SR may also utilize a specification or schedule that is known to occur at fixed intervals M. For example, the intervals M may be every 20 ms. Therefore, at every interval M, the UE has an opportunity to transmit the SR to the eNB when the UE has data to be transmitted. The interval M for SR opportunities may be more frequent than the cycle duration N of the C-DRX for a variety of reasons. For example, data traffic and voice data may be used in an application being executed by the UE. In another example, a lower value for the interval M corresponds to the UE being able to request resources for uplink transmissions faster, such as in a case voice and/or data packets from upper layers are received in a duration where uplink resources are not assigned or granted.

In such cases, the UE may transmit an SR in an immediately available SR opportunity. As the interval M for the SR opportunities may be more frequent than the duration N of the C-DRX cycle, there is a high likelihood that the active mode is required to transmit the SR when the sleep mode would otherwise be used for the C-DRX cycle as per the specification. That is, the onDuration is increased in a period of the C-DRX cycle. Therefore, the active mode may be used during an intermediary sleep duration of the C-DRX cycle.

Accordingly, the exemplary device, system, and method provide a mechanism in which the scheduling of the SR transmission is dynamically selected. The exemplary embodiments describe learning operations that may be performed in which a first learning operation identifies an uplink grant turnaround time in response to a SR transmission and a second learning operation that identifies an uplink grant behavior of the eNB. Using what is determined from the learning operations and based on various conditions being experienced, the UE may dynamically determine the scheduling of the SR transmission to optimize power conservation and a transmission efficiency.

FIG. 1 shows a UE 100 for determining when a SR is to be transmitted. Specifically, the UE 100 may exchange data with a base station of a wireless network, receive control channel information therefrom, and transmit a SR thereto. The UE 100 may represent any electronic device that is configured to perform wireless functionalities. For example, the UE 100 may be a portable device such as a smartphone, a tablet, a phablet, a laptop, a wearable, etc. In another example, the UE 100 may be a client stationary device such as a desktop terminal. The UE 100 may be configured to perform cellular and/or WiFi functionalities. The UE 100 may include a processor 105, a memory arrangement 110, a display device 115, an input/output (I/O) device 120, a transceiver 125, and other components 130. The other components 130 may include, for example, an audio input device, an audio output device, a battery that provides a limited power supply, a data acquisition device, ports to electrically connect the UE 100 to other electronic devices, etc.

The processor 105 may be configured to execute a plurality of applications of the UE 100. For example, the applications may include a VoLTE application that enables the UE 100 to perform a VoLTE call functionality. The VoLTE call application may perform all associated operations for the VoLTE call functionality to be performed including transmissions that are transmitted to and received from the LTE network. In another example, the processor 105 may execute a scheduling application that determines and/or processes the schedule associated with the C-DRX functionality as well as other uplink operations that are performed at known times. Specifically, the other uplink operations may include a hybrid automatic repeat request (HARQ) operation.

It should be noted that the exemplary scheduling application does not need to be executed by the processor 105. In another example, the functionality that is described herein for the scheduling application may be performed by the transceiver 125 executing firmware stored on an integrated circuit of the transceiver 125. In a further example, the functionality of the scheduling application may be performed by a separate integrated circuit with or without firmware.

In a further example, the processor 105 may execute a SR application 135. The SR application 135 may identify when the UE 100 is experiencing a data Tx ready event, e.g., the UE 100 has data that is to be transmitted from the UE 100 to the LTE network. The SR application 135 may also instruct when a SR is to be transmitted for the data Tx ready event so that the UE 100 will receive an uplink grant to transmit the data to the network.

In yet another example, the processor 105 may execute a learning application 140. As will be described in further detail below, the learning application 140 may perform learning operations associated with an uplink grant turnaround time and an uplink grant behavior. The learning application 140 may determine information related to when the SR is to be scheduled for transmission. In this manner, the learning application 140 may supply the information to the SR application 135 to determine when the SR is to be transmitted.

It should be noted that the above noted applications each being an application (e.g., a program) executed by the processor 105 is only exemplary. The functionality associated with the applications may also be represented as a separate incorporated component of the UE 100 or may be a modular component coupled to the UE 100, e.g., an integrated circuit with or without firmware. For example, the integrated circuit may include input circuitry to receive signals and processing circuitry to process the signals and other information. In addition, in some UEs, the functionality described for the processor 105 is split among two processors, a baseband processor and an applications processor. The exemplary embodiments may be implemented in any of these or other configurations of a UE. Furthermore, the SR application 135 and the learning application 140 being separate applications is only exemplary. In another exemplary embodiment, the SR application 135 and the learning application 140 may be portions of a single application, program, circuitry, etc.

The memory 110 may be a hardware component configured to store data related to operations performed by the UE 100. Specifically, the memory 110 may store data related to the various applications executed by the processor 105. For example, the VoLTE call application may utilize a phone book functionality that stores contact information for other users and UEs. In another example, the memory 110 may store the information of previous transmissions and receptions through the onDurations of the C-DRX cycles. In a further example, the memory 110 may store the findings of the learning application 140 including metadata associated with ultimate determinations of the learning operations. The display device 115 may be a hardware component configured to show data to a user while the I/O device 120 may be a hardware component that enables the user to enter inputs. It should be noted that the display device 115 and the I/O device 120 may be separate components or integrated together such as a touchscreen.

The transceiver 125 may be a hardware component configured to transmit and/or receive data. The transceiver 125 may enable communication with other electronic devices directly or indirectly through a network based upon an operating frequency of the network. The transceiver 125 may operate on a variety of different frequencies or channels (e.g., set of consecutive frequencies). Thus, an antenna (not shown) coupled with the transceiver 125 may enable the transceiver 125 to operate on the various frequencies. The transceiver 125 may be used for transmissions that are received from the base station (e.g., eNB) and sent to the base station. In a first example, the control channel information may be received from the eNB via the transceiver 125 during the onDuration as indicated by the C-DRX cycle. In a second example, the SR may be transmitted to the eNB via the transceiver 125 at a determined SR opportunity as determined by the learning application 140. In a third example, the voice transmission of the VoLTE application may be transmitted to a server of the LTE network via the eNB at the allocated time indicated by an uplink grant included in the control channel information.

Figure 2:
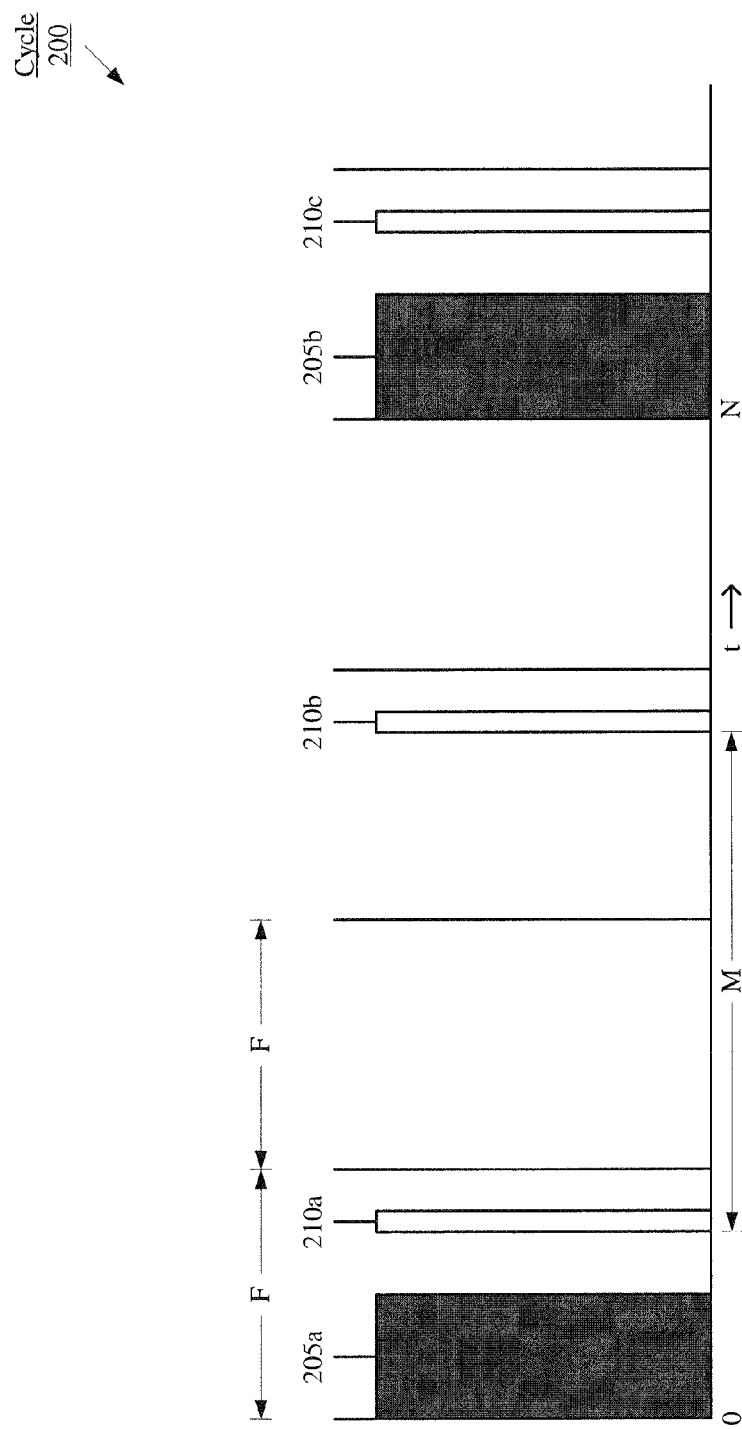
FIG. 2 shows a cycle for a C-DRX schedule and a scheduling request schedule according to various embodiments described herein.

FIG. 2 shows a cycle 200 for a C-DRX schedule and a SR schedule. The cycle 200 shows a combined schedule for the C-DRX cycle and the SR opportunities. Specifically, five complete frames are shown in the cycle 200 in which each frame may have a duration of, for example, 10 ms. The duration of the first two frames are labeled as F in FIG. 2. As shown, the onDurations 205a, 205b are included and separated by the interval N. Specifically, the beginning of the onDuration 205a occurs at a time 0 whereas the beginning of the onDuration 205b occurs at a time N. In one example, the time N may be 40 ms, meaning that the C-DRX cycle may be 40 ms (from the beginning of the onDuration 205a to the beginning of the next onDuration 205b). The SR opportunities 210a-c may also be included in the cycle 200, each SR opportunity 210a-c being separated by an interval M from adjacent SR opportunities as shown by the interval M between SR opportunity 210a and 210b. If it were considered that the interval M is 20 ms, every other frame may include one SR opportunity. Also as shown, the SR opportunities 210a-c may be scheduled at a time separate from the onDuration 205a-b, specifically, closer to an end of the frame duration.

It is noted that the illustration of the C-DRX cycle 200 is only exemplary. For example, the length of the onDuration is shown as being within a single frame. However, for a variety of reasons, the onDuration may be shorter or longer (e.g., more than a single frame). In another example, the duration of the frame F being 10 ms is only exemplary. As noted above, the C-DRX cycle may include various other cycle times such as 20 ms (i.e., the duration N is 20 ms). Accordingly, the frame F may be 5 ms with a cycle still containing four frames. In a further example, the duration M of the period between SR opportunities 210a-c being 20 ms is only exemplary. The duration M may be greater or lesser, such as 10 ms, such that there is one SR opportunity in every frame. In yet another example, the separation of the SR opportunities 210a-c from the onDurations 205a-b is only exemplary. The SR opportunities 210a-c may also be scheduled to overlap entirely or partially with the onDurations. The exemplary embodiments may be modified accordingly to account for any of these types of variations in the C-DRX cycle 200.

Figure 3A:
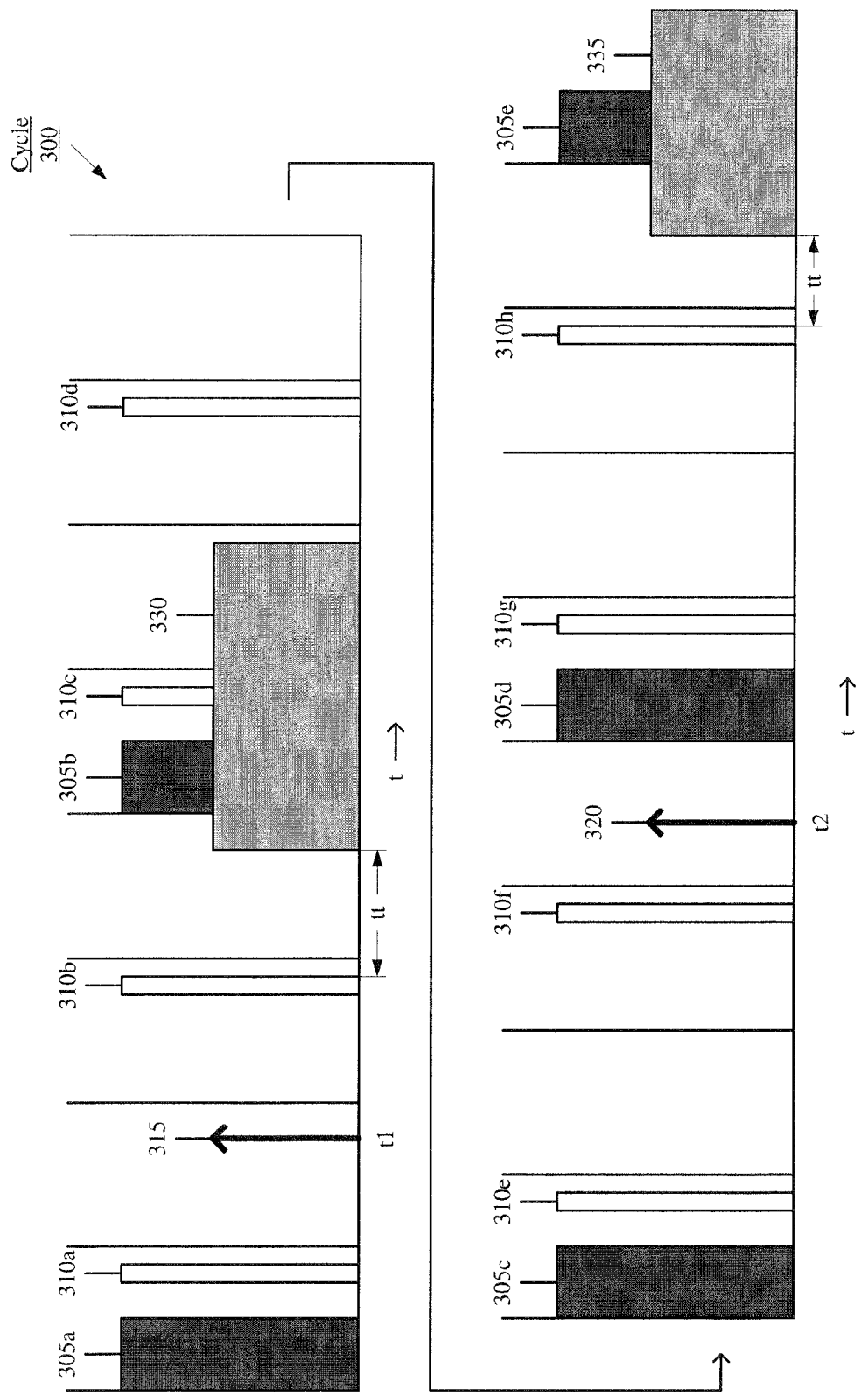
FIGS. 3A-B show exemplary cycles for transmitting scheduling requests according to various embodiments described herein.

FIG. 3a shows a cycle 300 for a C-DRX schedule that will be used to illustrate a first manner of dynamically scheduling the SR transmissions from the UE 100 to the network. This first manner is based, in part, on the turnaround time between when the SR is transmitted by the UE 100 and when the UE 100 receives the uplink grant to transmit the data. In addition, this first manner is also based, in part, on the time it will take for the UE 100 to complete the successful uplink of the data once the uplink grant is received. These two times will be used to select an SR transmission opportunity that results in the highest probability that the time the UE 100 is in the active mode in the C-DRX cycle (e.g., the OnDurations) maximally overlaps with the time the UE 100 is actively transmitting the data in the uplink grant and monitoring the network to ensure that the data is successfully transmitted. According to the exemplary embodiments of this first manner, the SR application 135 may use information provided by the learning application 140 to perform an adaptive SR suppression. The adaptive suppression refers to the fact that the SR application 135 may schedule the SR for a time after the next SR opportunity, e.g., the next one or more SR opportunities may be skipped (even though there is an SR ready to be transmitted) based, at least in part, on the information provided by the learning application 140.

Exemplary manners of determining the turnaround time and the uplink time will be described in greater detail below. It should be noted that when the UE 100 "receives the uplink grant" is used in this description, it is referring to the time that the UE 100 may actually start the uplink transmission of the data, not that the UE 100 has merely received an indication of when the uplink transmission may start.

The cycle 300 shows an extended version of the cycle 200 of FIG. 2. As shown, the cycle 300 includes onDurations 305a-e and SR opportunities 310a-h. The cycle 300 may also include similar characteristics to the cycle 200 shown in FIG. 2. For example, the C-DRX cycle may be 40 ms such that each frame is 10 ms.

The cycle 300 further includes uplink timeline durations 330, 335. The uplink timeline durations 330, 335 may be a time that it takes for an uplink operation to be performed. For example, the uplink timeline durations 330, 335 may be a HARQ timeline to perform HARQ related operations (e.g., a retransmission). Thus, the uplink timeline durations 330, 335 indicate an amount of time that the UE 100 will need to be in the active mode to accomplish an uplink transmission. The uplink timeline duration may include, for example, the time to transmit the packet in the schedule uplink grant subframe, the time to receive an ACK/NACK from the eNB, the time to perform HARQ operations if a NACK was received, the time to monitor subsequent ACK/NACK transmissions, etc. The above listing of various times for actions that may be included in the uplink timeline durations 330, 335 is only exemplary and other actions may also be included or some of the listed actions may not be included.

It should also be noted that while features of the C-DRX cycle and the uplink timeline duration are shown in the cycle 300 of FIG. 3A, these two concepts are not related. That is, each of the C-DRX cycle and the uplink timeline duration is a distinct concept. However, the SR application 135 will use features of each of these concepts to determine when to schedule the SR transmission and that is the purpose of showing these distinct features in the cycle 300. The reason these two unrelated concepts are used is that each of these features include a time when the processor 105 and the transceiver 125 (or specific subcomponents thereof) of the UE 100 will be fully powered (e.g., in the OnDuration of the C-DRX cycle and in the uplink time duration when the UE is actually performing the uplink transmission of data and the subsequent monitoring and HARQ operations). In addition, these two concepts also include other times when the processor 105 and the transceiver 125 (or specific subcomponents thereof) will be in a lower power state (e.g., outside of the OnDuration of the C-DRX cycle and outside of the uplink time duration when the UE is not performing any uplink transmissions). Thus, the SR application 135 will determine when to transmit the SR so that there is a high probability of maximum overlap between the higher power operations of the two features, thereby leaving a greater time when the components of the UE 100 may be in the lower power state to reduce power consumption.

The cycle 300 also shows the data Tx ready events 315 and 320. As noted above, the data Tx ready events 315 and 320 may be when the SR application 135 receives an indication that the UE 100 has data to be transmitted to the LTE network and the SR application 135 should determine when an SR should be transmitted to request an uplink for the data. As will be described in detail below, the SR application 135 may receive information from the learning application 140 to determine when to schedule the SR transmission for the data Tx ready events 315 and 320.

A first learning operation that may be performed by the learning application 140 may be to learn a SR grant turnaround time that is being experienced by the UE 100. In performing the first learning operation, the learning application 140 may determine the SR grant turnaround time for each transmitted SR. Initially, it may be assumed that the SR grant turnaround time may be for uplink grants issued in response to an SR that was transmitted (e.g., not a scheduled or random uplink grant). Prior to a current SR scheduling determination, the UE 100 may have transmitted one or more SRs for previous, respective data TX ready events. For each SR that was transmitted from the UE 100 to the LTE network, the learning application 140 may have tracked the SR grant turnaround time. That is, the learning application 140 may have determined the time taken between the SR transmission and the corresponding uplink grant decoded from a PDCCH received from the LTE network.

The learning application 140 may then determine SR statistics information based on the SR grant turnaround times. In making this determination, the learning application 140 may utilize different approaches. In a first exemplary approach, the learning application 140 may determine a mean and/or a variance of the SR grant turnaround times in a sliding window (e.g., a number of previous SR turnarounds). The first approach may also take the mean and/or the variance and back off from a latest SR sample. The sliding window may have a size dependent on a variety of factors. For example, the factors may include a network loading status, a detected Doppler value, a motion status reported by a motion sensor, etc. Thus, the size of the sliding window may account for the radio conditions the UE 100 is currently experiencing. In a second exemplary approach, the learning application 140 may use an infinite impulse response (IIR) filter to determine a mean value for the SR grant turnaround times. Those skilled in the art will understand that other exemplary statistical methods may also be used to determine the turnaround times.

As described above, once the SR statistics information for the turnaround time is determined by the learning application 140, this SR statistics information for the turnaround time may be used by the SR application 135 to select an SR opportunity such that the uplink timeline duration has a highest probability to overlap with an onDuration. Thus, when a data TX ready event is identified and a corresponding SR is to be scheduled, the SR application 135 may utilize the turnaround time, the uplink timeline duration, and the schedule of the onDurations to schedule the SR transmission to the LTE network.

Returning to FIG. 3A, the cycle 300 will be used to describe examples of the SR application 135 utilizing the turnaround time, the uplink timeline duration, and the schedule of the onDurations to schedule the SR transmissions. The first use case will be described for the data Tx ready event 315 that occurs at time $t_1$. Thus, starting at time $t_1$, the SR application 135 will determine when to transmit the SR that corresponds to the data Tx ready event 315. As described above, the goal of the SR application is to select an SR opportunity 310*b-h* to transmit the SR that will provide a high probability that there will be a maximum overlap between an onDuration 305*b-e* and the uplink timeline duration for the uplink of the data corresponding to the Tx ready event 315. As described above, the SR application 135 will receive the statistical determination of the turnaround time from the learning application 140. In this example, the turnaround time may be represented as the time duration $t_t$. The SR application 135 also knows the time when the OnDuration 305*b* will occur and the uplink time duration 330 for the data transmission corresponding to the Tx ready event 315. In this example, for the Tx ready event 315, the SR application 135 may determine that the turnaround time $t_t$ between the SR and the received uplink grant is such that the SR opportunity 310*b* should be selected so that the overlap between a next onDuration 305*b* and the uplink timeline duration 330 occurs as is illustrated in FIG. 3A. Accordingly, the SR application 135 may select the SR opportunity 310*b* to schedule the SR transmission corresponding to the Tx ready event 315. Therefore, based on the determined statistical turnaround time, no suppression mechanism is required in this example.

It should be noted that the illustration of FIG. 3A shows what should happen if the SR opportunity 310*b* is selected to transmit the SR. That is, the turnaround time $t_t$ is the expected turnaround time and the uplink timeline duration 330 is the expected uplink duration. The actual times for these actions may vary from the expected values. However, the statistical methods used to determine the expected values should result in the actual values being substantially similar to the expected values. However, the time of the OnDuration 305*b* and the SR opportunity 310*b* is set by schedule and therefore will be known times.

The second use case will be described for the data Tx ready event 320 that occurs at time $t_2$. Thus, starting at time $t_2$, the SR application 135 will determine when to transmit the SR that corresponds to the data Tx ready event 320. Again, the SR application 135 will receive the statistical determination of the turnaround time $t_t$ from the learning application 140. It should be noted that the time $t_t$ may be the same as the previous determination, but it may also change because of the sliding window calculation may use the previous sample (e.g., the data associated with the Tx ready event 315). The SR application 135 also knows the time when the next OnDurations 305*d-e* will occur and the uplink time duration 335 for the data transmission corresponding to the Tx ready event 320. In this example, for the Tx ready event 320, the SR application 135 may determine that the turnaround time $t_t$ between the SR and the received uplink grant is such that the SR opportunity 310*g* should be suppressed or skipped because it will result in the uplink time duration 335 not overlapping with any of the OnDurations 305*d* or 305*e*. In contrast, the SR application may determine that the overlap between the onDuration 305*e* and the uplink timeline duration 335 will occur as is illustrated in FIG. 3A if the SR opportunity 310*h* is selected to transmit the SR for the Tx ready event 320. Accordingly, the SR application 135 may select the SR opportunity 310*h* to schedule the SR transmission corresponding to the Tx ready event 320. Therefore, in the example of Tx ready event 320, a suppression mechanism is utilized to bypass SR opportunity 310*g*.

From the two examples of the Tx ready events 315 and 320, it can be seen that the SR application 135 may selectively use the suppression mechanism to schedule the corresponding SR based on the turnaround time, the SR opportunity schedule, the uplink timeline duration, and the schedule of the onDurations. It should be noted that based on the turnaround time, more than one SR opportunity in a row may be suppressed. For example, there may be situations, where the learning application 140 causes the SR associated with a data Tx ready event to skip multiple SR opportunities such as 310*c*, 310*d* and use SR opportunity 310*e* to transmit the SR.

Figure 3B:
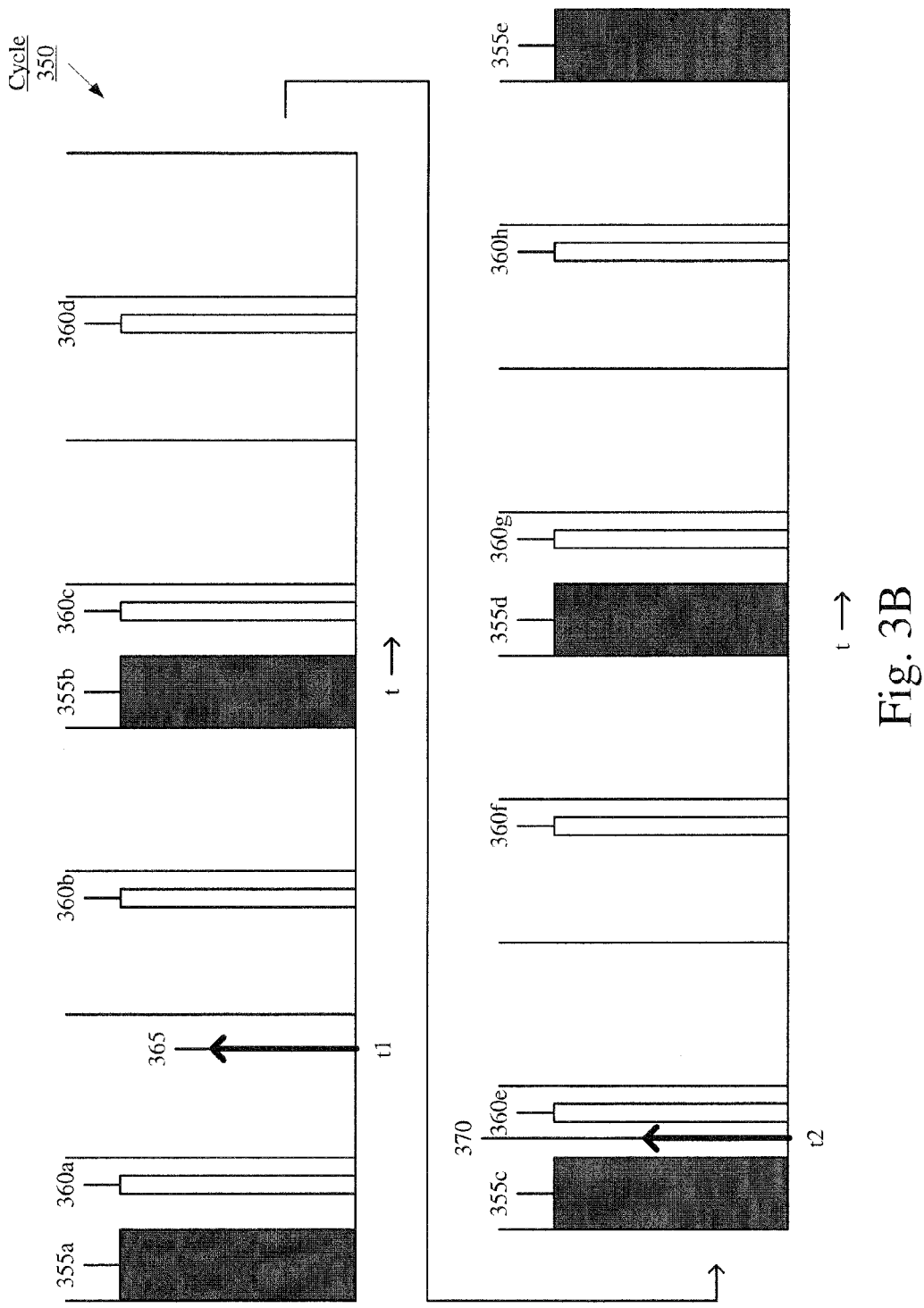

FIG. 3b shows a second cycle 350 for a C-DRX schedule that will be used to illustrate a second manner of dynamically scheduling the SR transmissions from the UE 100 to the network. This second manner is based, in part, on the learned behavior of the eNB to which the UE 100 is connected. Specifically, the learning application will determine if the eNB is providing uplink grants to the UE 100 in response to the SR transmissions or if the eNB is merely providing uplink grants during the OnDurations of the C-DRX cycle. According to the exemplary embodiments of this second manner, the SR application 135 may use this grant behavior information provided by the learning application 140 to perform an adaptive SR suppression. Specifically, if the eNB is only providing uplink grants during OnDurations, the SR application may suppress the SR transmissions until after a next OnDuration.

Thus, a second learning operation performed by the learning application 140 may be learning an uplink grant behavior of the eNB to which the UE 100 is currently associated. As will be described in further detail below, when the eNB is configured to only issue uplink grants during an onDuration of the C-DRX cycle (e.g., not in response to a received SR), the learning application 140 may select a SR opportunity that occurs after a next onDuration.

When the eNB issues an uplink grant in response to receiving a SR, the learning application 140 may select a SR opportunity that maximizes an overlap between an onDuration and an uplink timeline duration as described above with reference to FIG. 3A.

In performing the second learning operation directed to the uplink grant behavior of the eNB, the learning application 140 may determine whether the uplink grant that was issued (as decoded from the control information in the PDCCH received in an onDuration) is in an onDuration of a C-DRX cycle. The learning application 140 may determine a probability that a future uplink grant will fall into an onDuration of the C-DRX cycle. Specifically, the learning application 140 may determine a percentage of previous C-DRX cycles that have had an uplink grant in the onDuration. For example, referring to FIG. 3B, although the cycle 350 is a small sample size, the UE 100 may be in a time period after the SR opportunity 360g. Thus, the learning application 140 may determine how many of the previous onDurations 305a-d have had an uplink grant. It should be noted that the learning application 140 may have a significantly larger data pool of information regarding the C-DRX cycles and onDurations to determine the percentage.

The probability that is determined from the percentage may be set to a variety of values. In a first example, the percentage may be used to identify whether the eNB is configured to only issue uplink grants in an onDuration. Thus, the percentage may be required to be 100%. Thus, the probability may be a Boolean value in which a percentage of 100% indicates a "1" that the future uplink grant will be in the next onDuration of the C-DRX cycle. A percentage that is under 100% (even a fraction lower meaning that at least one time the uplink grant did not fall in an onDuration) may indicate a "0" that the future uplink grant may or may not be in the next onDuration of the C-DRX cycle as the uplink grant may or may not coincidentally fall in an onDuration. In a second example, the percentage may be used to correspond to the probability value. For example, the percentage of times the uplink grant falls in an onDuration may be converted to a decimal value. In such a scenario, the learning application 140 may utilize a minimum threshold value that the probability must satisfy to determine whether the future uplink grant will fall into the next onDuration (e.g., greater than 75%).

Using the first example above (i.e., 100% condition), the learning application 140 may determine whether certain conditions exist in its current connection with the eNB. First, the learning application 140 may determine if the uplink grant is determined to always fall into the onDuration of the C-DRX cycle. Second, the learning application 140 may determine if the uplink grant in each onDuration is independent of any SR transmission from the UE 100. When these conditions apply, the learning application 140 may determine that a next SR should be transmitted in the first SR opportunity following the next onDuration. As an uplink grant may already be included in the next onDuration, this uplink grant may be used to transmit the data associated with the SR (even though a corresponding SR for the data has not yet been sent). In this manner, the SR transmission may be cancelled because the data has already been sent in the uplink that was granted during the onDuration. Thus, as was described above, by scheduling the SR for the first SR opportunity after the next onDuration, the SR application 135 has removed the need to actually transmit the SR.

When the above conditions do not apply, the SR application 135 may revert to the process described above for FIG. 3A, e.g., select a SR opportunity that results in a high probability that there is an overlap between an onDuration and an uplink timeline duration. For example, if the learning application 140 determines that any uplink grant was ever not in an onDuration and/or if any uplink grant was issued in response to a transmitted SR, the learning application 140 may provide an indication to the SR application 135 that the second manner of dynamically scheduling the SR transmissions should not be used because the behavior of the eNB does not lend itself to this type of operation. In another example, even if all uplink grants were in an onDuration, if any uplink grant was in response to a transmitted SR, the learning application 140 may still indicate to the SR application 135 that the second manner should not be used because there is a chance that an uplink grant may not occur in an OnDuration. In fact, under the conditions of the first example above (i.e., 100% condition), if there is an uplink grant that is ever not in an onDuration, the learning application 140 may indicate to the SR application 135 that the second manner should not be used while the UE 100 is associated with the current eNB.

In the second example described above, the learning application 140 may apply a threshold to the grant behavior. The example provided above indicated that if 75% or more of the uplink grants occurred in an OnDuration, the learning application 140 may provide an indication to the SR application 135 that the second manner of scheduling SR transmissions should be used, e.g., scheduling SR transmissions for an SR opportunity that occurs after the next OnDuration. Those skilled in the art will understand that the threshold provided above is only exemplary and other thresholds may be used based on experience. In the second example, if the learning application 140 determines that the grant behavior does not satisfy the threshold, the learning application 140 may indicate to the SR application 135 that the second manner should not be used. Thus, SR application 135 may revert to use the first manner for scheduling SR transmissions.

Returning to FIG. 3B, the cycle 350 will be used to describe examples of the SR application 135 utilizing the second manner of scheduling the SR transmissions, e.g., scheduling SR transmissions for an SR opportunity that occurs after the next OnDuration based on the uplink grant behavior of the eNB to which the UE 100 is attached. The first use case will be described for the data Tx ready event 365 that occurs at time $t_1$. Thus, starting at time $t_1$, the SR application 135 will determine when to transmit the SR that corresponds to the data Tx ready event 365. It may be considered at this point that the learning application 140 has previously determined that the eNB grant behavior satisfies the conditions for using the second manner of scheduling SR transmissions, e.g., the eNB only issues uplink grants during the onDurations, the eNB issues uplink grants in OnDurations above a threshold value, etc. This determination by the learning application 140 may have occurred for the eNB in cycles prior to the cycle 350 being illustrated in FIG. 3B. The learning application 140 may have communicated this learned eNB behavior to the SR application 135 to indicate that the second manner of scheduling SR transmissions may be used.

Thus, when the SR application 135 becomes aware of data Tx ready event 365 at time $t_1$, the SR application 135 will understand that the second manner of scheduling the corresponding SR transmission should be used. In this case, the SR application 135 may determine that the SR transmission for the data Tx ready event 365 should be sent after the next onDuration 355b. Therefore, the SR application 135 will not schedule the SR transmission for the next SR opportunity

360*b*, but will suppress that opportunity and schedule the SR transmission for the SR opportunity 360*c* that occurs after the next OnDuration 355*b*. As the onDuration 355*b* may include an uplink grant, the data associated with the data Tx ready event 365 may be transmitted in an uplink transmission using the uplink grant of the onDuration 355*b*. If this is the case, the SR application 135 may determine that the SR transmission for the data Tx ready event 365 is no longer needed and the SR transmission may simply be canceled as it is unnecessary. Therefore, this first use case shows a suppression mechanism is used to suppress the SR opportunity 360*b*.

The second use case will be described for the data Tx ready event 370 that occurs at time t2. Thus, starting at time t2, the SR application 135 will determine when to transmit the SR that corresponds to the data Tx ready event 370. Again, it may be considered at this point that the learning application 140 has previously determined that the eNB grant behavior satisfies the conditions for using the second manner of scheduling SR transmissions. Thus, when the SR application 135 becomes aware of data Tx ready event 370 at time t2, the SR application 135 will understand that the second manner of scheduling the corresponding SR transmission should be used. In this case, the SR application 135 may determine that the SR transmission for the data Tx ready event 370 should be sent after the next onDuration 355*d*. Therefore, the SR application 135 will not schedule the SR transmission for the next two SR opportunities 360*e-f*, but will suppress those opportunities and schedule the SR transmission for the SR opportunity 360*g* that occurs after the next OnDuration 355*d*. As the onDuration 355*d* may include an uplink grant, the data associated with the data Tx ready event 370 may be transmitted in an uplink transmission using the uplink grant of the onDuration 355*d*. If this is the case, the SR application 135 may determine that the SR transmission for the data Tx ready event 370 is no longer needed and the SR transmission may simply be canceled as it is unnecessary. Therefore, this second use case shows a suppression mechanism is used to suppress the multiple SR opportunities 360*e-f*.

Figure 4:
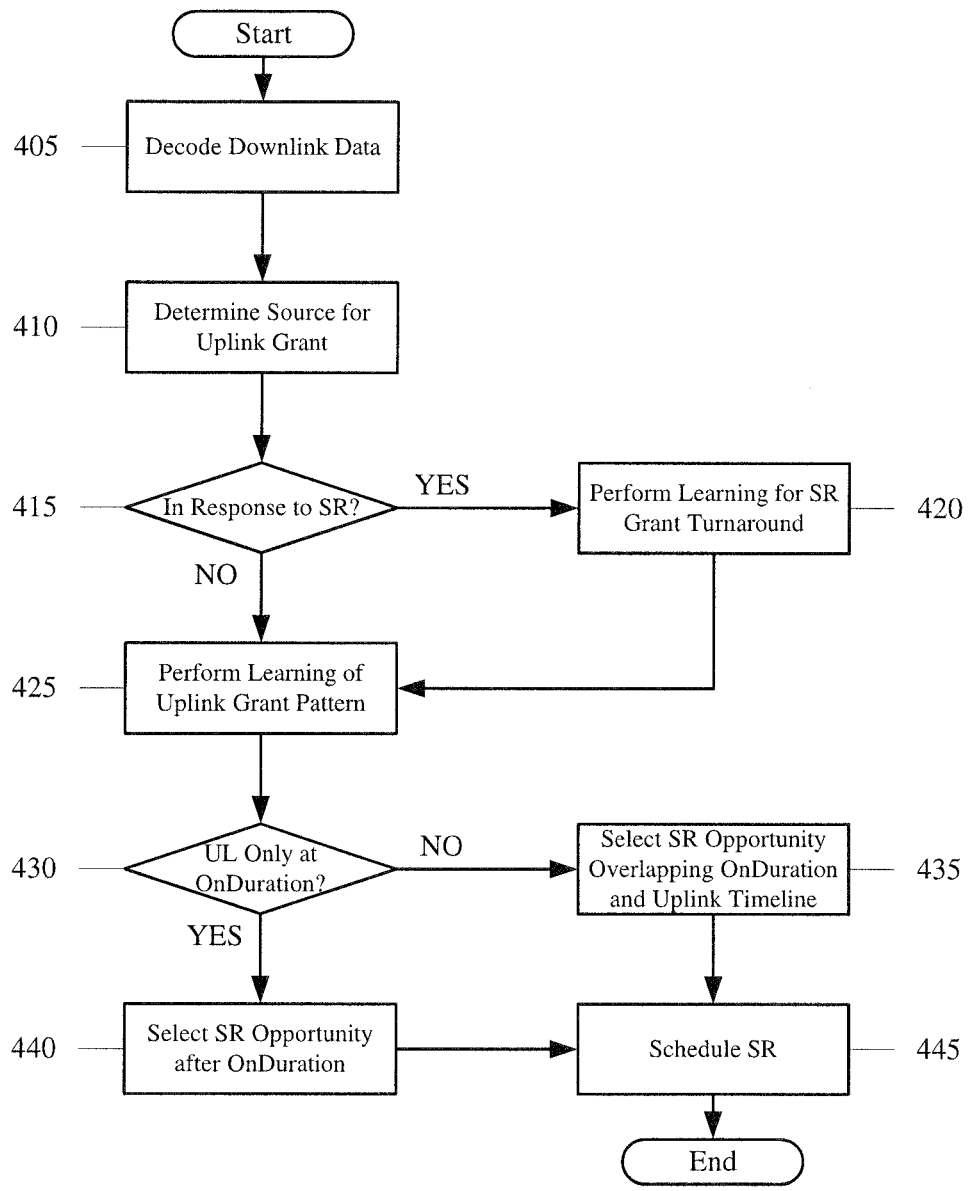
FIG. 4 shows a method for determining when a scheduling request is to be transmitted according to various embodiments described herein.

FIG. 4 shows a method 400 for determining when a SR is to be transmitted. That is, the method 400 determines when to schedule the SR for transmission to the LTE network. The method 400 relates to the SR application 135 determining when to transmit a SR based on information supplied by the learning application 140. The method 400 will be described with regard to the UE 100 of FIG. 1 and the cycles 300-350 of FIGS. 3A-B.

In 405, the UE 100 decodes downlink data. Specifically, the UE 100 decodes control information included in the PDCCH received during an onDuration. For illustrative purposes, the control information may be assumed to include an uplink grant. However, if the control information does not include an uplink grant, the method 400 may end. In 410, the UE 100 determines a source for the uplink grant included in the control information. As described above, the uplink grant may be issued for a variety of reasons. In a first example, the uplink grant may be in response to a SR transmitted from the UE 100 and received by the LTE network. In a second example, the uplink grant may be issued by the LTE network regardless of any received SR from the UE 100.

In 415, the learning application 140 may determine whether the uplink grant is in response to a SR transmitted from the UE 100. If the uplink grant is in response to the SR, the UE 100 continues the method 400 to 420. In 420, the learning application 140 performs a learning operation associated with the SR grant turnaround time. That is, the first learning operation described above may be performed including the new information associated with the uplink grant identified in 410. If the uplink grant is not in response to the SR or the first learning operation is performed in 420, the UE 100 continues the method 400 to 425. In 425, the learning application 140 performs a learning operation associated with the eNB uplink grant behavior. That is, the second learning operation described above may be performed including the new information associated with the uplink grant identified in 410.

In 430, the learning application 140 determines whether the uplink grant behavior of the eNB to which the UE 100 is associated is only issued during onDurations of the C-DRX cycle. If the uplink grants are not in onDurations or not only in onDurations or do not satisfy the threshold as described above, the UE 100 continues the method 400 to 435. In 435, the SR application 135 selects a SR opportunity that has a high probability of resulting in an overlap between an onDuration and an uplink timeline duration for the uplink of the data. As described above, this determination is based, in part, on the information that is determined during the first learning operation (e.g., the turnaround time). In this manner, the SR application 135 may help the UE 100 conserve power by scheduling SR transmissions in an attempt to have overlap between an onDuration and an uplink timeline duration for the uplink of the data.

If the uplink grants are only in onDurations, the UE 100 continues the method 400 to 440. In 440, the UE 100 selects a SR opportunity that follows a next onDuration. In this manner, data associated with a data Tx ready event may be sent in an uplink transmission even with no SR that is transmitted as an uplink grant is still identified in the PDCCH of the next onDuration. Accordingly, in step 445, data Tx ready events may have a corresponding SR scheduled according to the SR opportunity following the onDuration and subsequently have the scheduled SR transmission canceled if the data has already been transmitted. It should be noted that the data may not be transmitted every time during the onDuration so the SR may still be transmitted in the SR opportunity as scheduled after the next onDuration.

The exemplary embodiments provide a device, system, and method to adaptively utilize a suppression mechanism in scheduling a SR transmission for a SR arrival. A configuration of the eNB to which the UE is associated may be that uplink grants are issued upon receiving a SR from the UE or regardless of a SR being received. When the uplink grants are issued in response to the SR, the exemplary embodiments may schedule the SR in a SR opportunity that maximizes an overlap between an onDuration of the C-DRX cycle and an uplink timeline duration. When the uplink grants are issued regardless of the SR, the exemplary embodiments may schedule the SR in a SR opportunity that follows a next onDuration.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a user equipment (UE) associating with an evolved Node B (eNB) to establish a connection to a Long Term Evolution (LTE) network, the UE and the LTE network configured with and utilizing a Connected Discontinuous Reception (C-DRX) functionality, the C-DRX functionality including a cycle with at least one scheduling request (SR) opportunity:
   determining an SR is to be transmitted to the LTE network, wherein the SR corresponds to data that is to be transmitted by the UE;
   determining an uplink grant behavior of the eNB, wherein the uplink grant behavior includes an indication of previous uplink grants occurring in onDurations of the cycle of the C-DRX functionality;
   determining whether the uplink grant behavior of the eNB satisfies at least one predetermined threshold;
   when the uplink grant behavior satisfies the at least one predetermined threshold, selecting one of the at least one SR opportunity that follows a next onDuration relative to when the determination that the SR is to be transmitted occurred; and
   scheduling the SR in the one of the at least one SR opportunity that follows the next onDuration.

2. The method of claim 1, wherein the uplink grant behavior further includes an indication of the previous uplink grants that occurred independently of a previous SR.

3. The method of claim 1, further comprising:
   determining an uplink grant turnaround time associated with the eNB, the uplink grant turnaround time being a measure of time corresponding to the eNB issuing an uplink grant in response to a SR that is received from the UE, wherein the measure is a mean or a variance of the uplink grant turnaround time in a sliding window or a mean value of the uplink grant turnaround time calculated using an infinite impulse response (IIR) filter.

4. The method of claim 3, further comprising:
   when the uplink grant behavior of the eNB does not satisfy the at least one predetermined threshold, selecting one of the at least one SR opportunity based on the uplink grant turnaround time.

5. The method of claim 1, wherein the next onDuration includes a next uplink grant, the method further comprising:
   transmitting the data in an uplink transmission using the next uplink grant.

6. The method of claim 5, further comprising:
   cancelling the SR scheduled in the one of the at least one SR opportunity that follows the next onDuration.

7. The method of claim 5, further comprising:
   suppressing the scheduling of the SR to bypass at least one following SR opportunity from a time at which it is determined that the SR is to be transmitted.

8. A user equipment, comprising:
   a transceiver configured to associate with an evolved Node B (eNB) to establish a connection to a Long Term Evolution (LTE) network, the UE and the LTE network configured with and utilizing a Connected Discontinuous Reception (C-DRX) functionality, the DRX functionality including a cycle with at least one scheduling request (SR) opportunity; and
   a processor configured to control an operation of the transceiver by:
   determining an SR is to be transmitted to the LTE network, wherein the SR corresponds to data that is to be transmitted by the UE;
   determining an uplink grant behavior of the eNB, wherein the uplink grant behavior includes an indication of previous uplink grants occurring in onDurations of the cycle of the C-DRX functionality;
   determining whether the uplink grant behavior of the eNB satisfies at least one predetermined threshold;
   when the uplink grant behavior satisfies the at least one predetermined threshold, selecting one of the at least one SR opportunity that follows a next onDuration relative to when the determination that the SR is to be transmitted occurred; and
   scheduling the SR in the one of the at least one SR opportunity that follows the next onDuration.

9. The user equipment of claim 8, wherein the uplink grant behavior further includes an indication of the previous uplink grants that occurred independently of a previous SR.

10. The user equipment of claim 8, wherein the processor is configured to control the operation of the transceiver by:
    determining an uplink grant turnaround time associated with the eNB, the uplink grant turnaround time being a measure of time corresponding to the eNB issuing an uplink grant in response to a SR that is received from the UE, wherein the measure is a mean or a variance of the uplink grant turnaround time in a sliding window or a mean value of the uplink grant turnaround time calculated using an infinite impulse response (IIR) filter.

11. The user equipment of claim 10, wherein the processor is configured to control the operation of the transceiver by:
    when the uplink grant behavior of the eNB does not satisfy the at least one predetermined threshold, selecting one of the at least one SR opportunity based on the uplink grant turnaround time.

12. The user equipment of claim 8, wherein the next onDuration includes a next uplink grant, wherein the processor is configured to control the operation of the transceiver by:
    transmitting the data in an uplink transmission using the next uplink grant.

13. The user equipment of claim 12, wherein the processor is configured to control the operation of the transceiver by:
    cancelling the SR scheduled in the one of the at least one SR opportunity that follows the next onDuration.

14. The user equipment of claim 12, wherein the processor is configured to control the operation of the transceiver by:
    suppressing the scheduling of the SR to bypass at least one following SR opportunity from a time at which it is determined that the SR is to be transmitted.

15. An integrated circuit, comprising:
    circuitry to determine that a UE has associated with an evolved Node B (eNB) to
    establish a connection to a Long Term Evolution (LTE) network, the UE and the network configured with and utilizing a Connected Discontinuous Reception (C-DRX) functionality, the DRX functionality including a cycle with at least one scheduling request (SR) opportunity;

circuitry to determine that an SR is to be transmitted to the LTE network, wherein the SR corresponds to data that is to be transmitted by the UE;

circuitry to determine an uplink grant behavior of the eNB, wherein the uplink grant behavior includes an indication of previous uplink grants occurring in onDurations of the cycle of the C-DRX functionality;

circuitry to determine whether the uplink grant behavior of the eNB satisfies at least one predetermined threshold;

when the uplink grant behavior satisfies the at least one predetermined threshold, circuitry to select one of the at least one SR opportunity that follows a next onDuration relative to when the determination that the SR is to be transmitted occurred; and circuitry to schedule the SR in the one of the at least one SR opportunity that follows the next onDuration.

16. The integrated circuit of claim 15, further comprising:

circuitry to determine an uplink grant turnaround time associated with the eNB, the uplink grant turnaround time being a measure of time corresponding to the eNB issuing an uplink grant in response to a SR that is received from the UE, wherein the measure is a mean or a variance of the uplink grant turnaround time in a sliding window or a mean value of the uplink grant turnaround time calculated using an infinite impulse response (IIR) filter.

17. The integrated circuit of claim 16, further comprising:

When the uplink grant behavior of the eNB does not satisfy the at least one predetermined threshold, circuitry to select one of the at least one SR opportunity based on the uplink grant turnaround time.

18. The integrated circuit of claim 17, wherein selecting one of the at least one SR opportunity based on the uplink grant turnaround time is further based on an uplink timeline duration, wherein the uplink timeline duration is a hybrid automatic repeat request (HARQ) timeline.

19. The integrated circuit of claim 18, wherein selecting one of the at least one SR opportunity based on the uplink grant turnaround time is further based on a probability that a known time of an onDuration and the uplink timeline duration will overlap.

* * * * *